United States Patent [19]

Bambara

[11] 3,948,436
[45] Apr. 6, 1976

[54] MULTILAYER BAG
[75] Inventor: John D. Bambara, Osterville, Mass.
[73] Assignee: Packaging Industries, Inc., Hyannis, Mass.
[22] Filed: Nov. 4, 1974
[21] Appl. No.: 520,955

[52] U.S. Cl. .................. 229/55; 206/245; 206/523; 229/3.5 R; 428/193; 428/310; 428/315
[51] Int. Cl.² .................................................. B65D 33/02
[58] Field of Search ................... 229/55, 53, 3.5 R; 206/313, 523, 524, 245, 260; 161/161, 160, 149; 428/192, 193, 194, 3, 3.5

[56] References Cited
UNITED STATES PATENTS

| | | | |
|---|---|---|---|
| 2,415,387 | 2/1947 | Graebner et al. | 206/245 X |
| 2,674,509 | 4/1954 | Barnet | 229/55 X |
| 3,317,038 | 5/1967 | Bade et al. | 206/313 |
| 3,460,740 | 8/1969 | Hagen | 229/53 |
| 3,685,720 | 8/1972 | Brady | 229/62 |
| 3,768,724 | 10/1973 | Hill | 229/53 |

FOREIGN PATENTS OR APPLICATIONS
2,217,954  4/1974  France

Primary Examiner—William Price
Assistant Examiner—Stephen P. Garbe
Attorney, Agent, or Firm—Brumbaugh, Graves, Donohue & Raymond

[57] ABSTRACT

A tear and puncture resistant and padded shipping bag is formed from a laminate including at least one layer of tear resistant, synthetic fibrous material, and at least one layer of synthetic foam padding. The fibrous material and the padding are secured together at contiguous faces by, for example, an intermediate thermoplastic layer bonded between the tear resistant and padding layers. The bag, so formed, is particularly appropriate for containing pointed or sharp edged objects.

11 Claims, 6 Drawing Figures

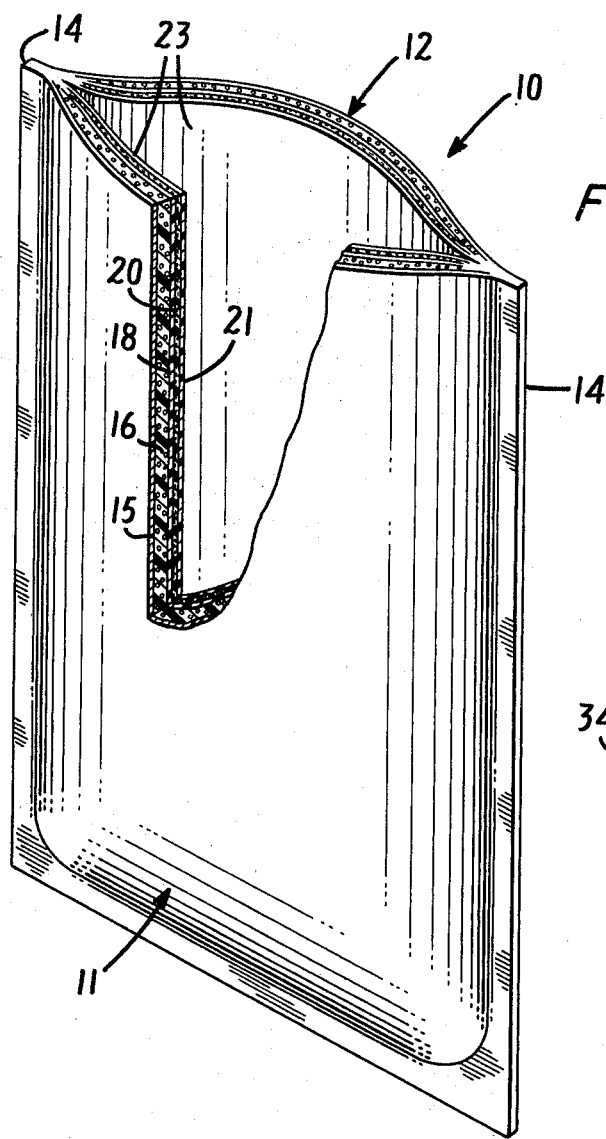
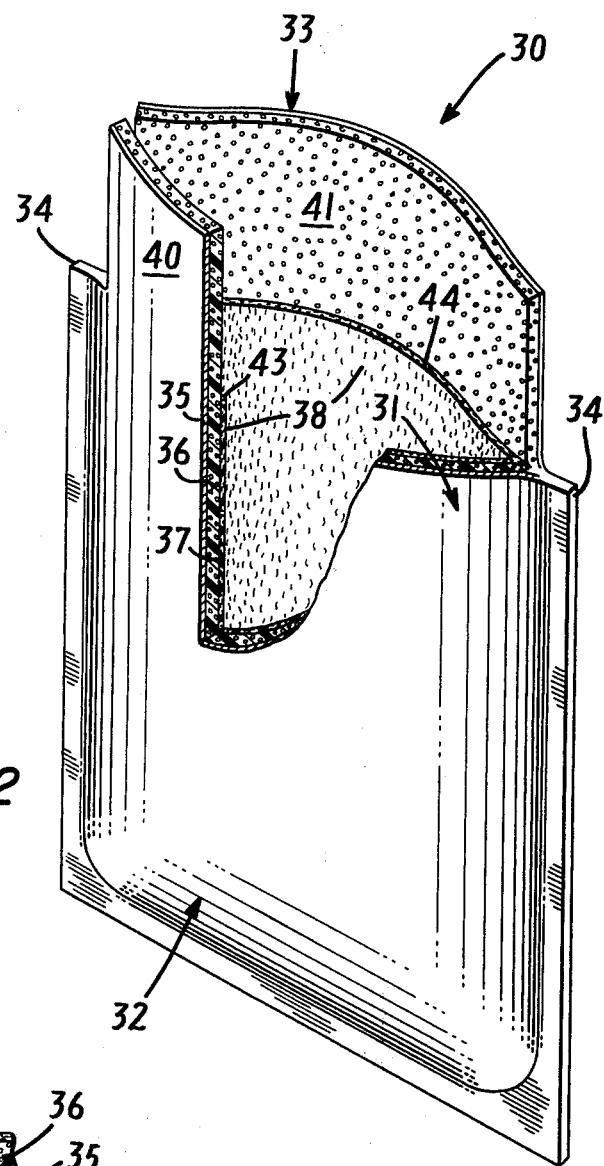
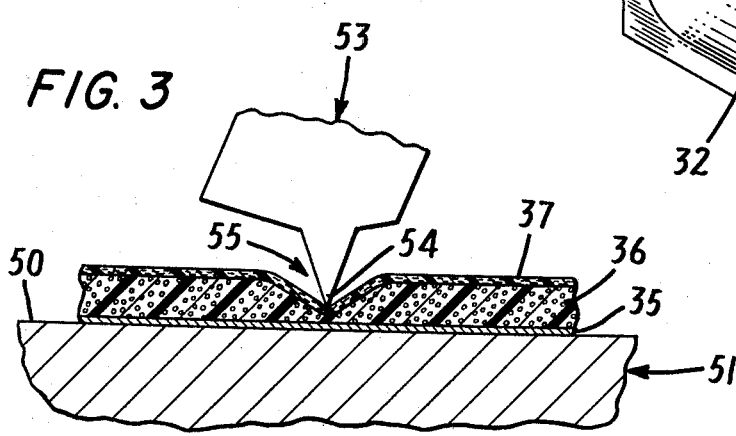
FIG. 1
FIG. 2
FIG. 3

MULTILAYER BAG

BACKGROUND OF THE INVENTION

This invention relates to improved packages, and more particularly to improved multilayer bags.

Several important difficulties are encountered in packaging articles having sharp edges, points or corners. First, such articles commonly pierce their package from within, endangering persons and property. Paper bags or sacks are particularly defective in this respect. Second, even the most tear resistant bag, while it may reduce to some extent the likelihood of the contained article protruding from within, fails adequately to protect the packaged articles at easily broken points or sharp edges. Padding that might give a degree of protection to the packaged article, and thereby reduce the latter defect to some extent, ordinarly does not resist puncture from within. Clearly, then, packaging sharp and relatively fragile articles inexpensively, in a padded bag, extremely resistant to puncture from within, is desirable.

A further desirable characteristic of bags for packaging such potentially injurous articles is extreme resistance to accidental opening or opening by tiny children. Tear resistance is important even to the degree of making tearing open of the bag virtually impossible.

Multilayer bags are known for various purposes. Padded bags are known wherein a padding or insulating filling material is loosely contained in the bag wall. Bags with inner moisture impervious thermoplastic layers are known. Moreover the formation of a much improved multilayer shipping bag including sheets of polyethylene foam is suggested in copending U.S. patent application Ser. No. 419,923 of John D. Bambara and Dennis Knaus, filed Nov. 27, 1973 and assigned to the assignee of this invention. None of these bags is believed to combine the extreme resistance to puncture from within and to tearing that is afforded by the invention described below.

SUMMARY OF THE INVENTION

According to this invention a bag is formed from sheets having joined layers of synthetic foam padding material and synthetic fibrous tear resistant material. The tear resistant material can be a commercially available material formed from nonwoven synthetic fibers and should be positioned interiorly of the padding. The padding preferably is polyethylene or similar foam that is very porous, light and resiliently deformable. These two layers are joined along contiguous faces.

In combination, and contrary to what would be expected, the padding that lies on the opposite side of the tear resistant material from a packaged pointed or sharpened object contributes to both puncture resistance and tear resistance. When points or sharpened edges engage the inner tear resistant material, the padding must be compressed before puncture can occur.

The padding foam makes the combination nearly impossible to tear manually. This is believed to result from the difficulty of gripping the tear resistant layer once the resilient foam is applied and because the foam prevents the easy application of usual tearing forces to the tear resistant layer.

To join the layer of padding and the layer of tear resistant fibrous material, the layers can be adhesively joined or an interposed thermoplastic sheet can be adhesively joined between the layers to bond together the layers and increase moisture proofing. An outermost layer of kraft improves appearance, allows labeling, and prevents abrading of the foam.

In certain applications a polyethylene inner liner bonded to the fibrous tear resistant layer enhances moisture imperviousness, prevents abrasion of the tear resistant material, and prevents a smooth interior to a packaged article. For convenient handling the bag opening can be defined between flaps that may or may not contain the tear resistant layer. Where that layer is omitted, sealing is convenient by the application of heat to cause the padding, which in the case of polyethylene foam is thermoplastic, to bond onto an overlapped outer surface.

BRIEF DESCRIPTION OF THE DRAWINGS

The invention will be more fully understood from the following detailed description of exemplary preferred embodiments considered with the several figures of the accompanying drawings. In the drawings:

FIG. 1 is a perspective view of a bag embodying the invention, broken away for clarity and illustrating the multiple layer construction of the bag.

FIG. 2 is a further perspective view of a second bag embodying the invention with parts broken away for clarity and showing another multiple layer construction and flap closure construction.

FIG. 3 is an enlarged fragmentary cross-sectional view and shows a part of a sharp edged article engaging the interior of the bag illustrated in FIG. 2.

DESCRIPTION OF PREFERRED EMBODIMENTS

Figure 4:
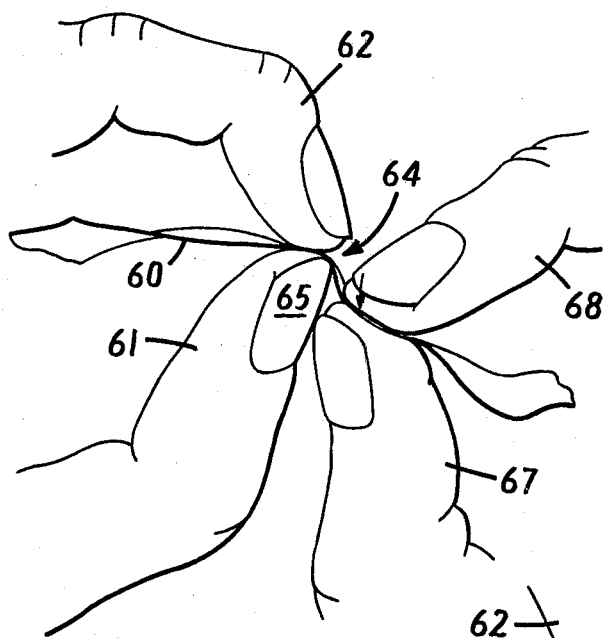
FIG. 4 is a diagramatic illustration of the application of ordinary tearing forces to a sheet of thin material.

In FIG. 1, a bag 10 according to the invention includes first and second multilayer sheets 11 and 12 respectively, sealed at a seam 4 to form the bag. In the bag embodiment of FIG. 1 an outer layer of kraft or other paper 15 is bonded to a cushion or padding layer 16 of polyethylene foam. A polyethylene or like synthetic plastic intermediate sheet 18 joins the padding layer 16 to a layer of tear resistant material 20. Finally, an innermost liner 21 of, again, polyethylene sheet or a like synthetic plastic forms the inner bag face.

The several lamina that comprise each of the multilayer sheets 11 and 12 are bonded where their contiguous surfaces adjoin. The kraft-foam interface can be joined by applying adhesive therebetween, for example as described in the copending application Ser. No. 419,923, identified above. The adhesive can be a heat activatable product, applied as a coating to the kraft, and thereafter activated to bond the foam layer to the kraft. The foam is about ⅛ inches thick, is highly porous and spongelike, and is resiliently deformable and extremely light. The tear resistant layer 20 is preferably a sheet of material that is formed from nonwoven synthetic fibers, an example is that material known by E. I. Dupont de Nemours and Company's trademark Tyvek. This material is very light, is thin, like paper, has a relatively smooth and paperlike surface, but is formed, rather than from wood fibers, from synthetic or plastic fibers compressed into a nonwoven sheet. The intermediate plastic sheet 18 between the foam and tear resistant layers 16 and 20 can be adhesively bonded to those two layers. Again, a heat activated adhesive can be used, and can be applied cold to the Tyvek layer to form a coating thereon later to be activated. Finally, the innermost thermoplastic liner 21 can be similarly joined along its face to tear resistant layer 20, by adhesive resistant layer 20, by the application of heat. The innermost liner 21, then, presents smooth bag interior surfaces 23, moisture impervious and suitable to resist abrasion of the tear resistant fibrous layer.

The bag 10 of FIG. 1 can be formed automatically and continuously by bringing together two continuous multilayer sheets like sheets 11 and 12, continually and automatically heat sealing adjoining thermoplastic sheets 18 at their edges, or by use of a selectively applied adhesive. Alternatively, the bag bottom can be formed by folding a single multilayer sheet and sealing together side seams, or the bag can be constructed in any convenient manner without departure from the invention.

In FIG. 2, a bag 30, embodying the invention, includes a bag body 31 formed from two three layer sheets 32 and 33 joined along a seam 34. The bag's exterior layer 35 is kraft, followed inwardly by a layer of foam padding 36, and an innermost liner 37 of tear resistant material. As in the embodiment of FIG. 1, the padding or cushioning foam layer 36 can be polyethylene foam or like material joined, as in that embodiment, with the outer kraft layer. The tear resistant layer 37 is preferably Tyvek or a material of like characteristics. The tear resistant and foam layers can be joined adhesively. As in the FIG. 1 embodiment, a thermoplastic sheet may be interposed between the foam and tear resistant layers 35 and 36. The seam 34 forming the bag 30 from the separate multilayer sheets 32 and 33 may be formed automatically by the application of adhesive along the side and bottom sheet surfaces to cause adherence between innermost surfaces 38 of the tear resistant liner 37 where those surfaces meet at the seam 34. Any convenient method of forming the seam can by employed and again the bag can be constructed by any of a number of convenient methods.

The bag 30 includes a pair of closure flaps 40 and 41 which may or may not include all three layers of the multilayer sheets 32 and 33 forming the bag body 31. In FIG. 2 the flaps 40 and 41 include only the kraft and foam layers 35 and 36, the tear resistant liner 37 terminating along edges 43 and 44 at the upper opening end of the bag body 31. This flap construction permits easy opening of the bag, at the opening end only, after the more easily torn flaps have been folded and sealed in place. Because the tear resistant Tyvek or like material inner liner 37 protects the bag proper, that is to say the bag body 31 which is the packaging portion of the bag, increased tear and puncture resistance is provided there. When closed tightly, the bag brings together the upper interior edges 43 and 44 of the inner tear resistant layer 37. Similarly, flaps 40 and 41 can be kraft only, exclusive of any other layer. In that case, tightly closing the bag brings together a pair of upper foam edges that are located with the upper edges 43 and 44 of the tear resistant layer to enclose the bag body interior entirely in both the tear resistant and foam material.

In FIG. 3 a cross section of a segment of a bag 30 of FIG. 2 is shown bearing on a surface 50 of a member 51. This bag segment is a part of one multilayer sheet forming the body 31 of the bag 30. The outer kraft covering 35 bears directly on the surface 50 and the intermediate padding or cushioning foam layer 36 separates the kraft and the inner Tyvek or other tear resistant liner 37.

FIG. 3 demonstrates the resistance to internal puncture that is afforded by bags constructed according to the invention. A fragment 53 of an object packaged in the bag has a sharp edge or point 54, ordinarily likely to pierce conventional bags. The liner 37 is, itself, resistant to accidental cutting, tearing or puncture. In combination with the padding layer 36 of polyethylene or like foam, however, puncture resistance increases significantly. The tear resistant liner 37, cushioned by the foam layer 36, moves with the packaged object, compressing the foam into the narrowed depression designated by the numeral 55. Before being cut or punctured from within, then, the liner 37 must compress the foam layer 36, which compression absorbs and distributes much of the force applied to the liner. Commonly, in ordinary handling, the cushioning that the foam layer 36 provides will be sufficiently force absorbing to prevent cutting or piercing of the tear resistant liner. Even when the bag is pinched between its packaged object and some immovable other object, the liner 37 moves with the point or cutting edge.

The foam layer 16 of FIG. 1 gives similar force absorbing cushioning to the layer of tear resistant material 20. It is the foam and tear resistant layer combination that gives this improved puncture protection, whether alone or combined with additional layers of other materials. The cushioning foam in both bags protects sharp edges, points, or generally fragile members. The kraft paper outer surface allows the bag to be handled and marked in the usual manner. And the bag is extraordinarily resistant to tearing open from the outside.

As with puncture resistance, the foam and tear resistant layer combination gives a combined resistance to tearing that exceeds what would be expected from the sum of the two component parts. A polyethylene foam layer is more tear resistant than many other foams. Such a layer, combined with paper, is more difficult to tear than other shipping bag materials, ans much stronger than any material of comparable weight. Compared with the extreme strength of the Tyvek material, on the other hand, even polyethylene foam is so much easier to tear that its addition would not be expected to add any improvement at all to the Tyvek sheet. Yet ordinarily, a healthy adult will be able to tear apart a bag according to this invention only with extreme effort, if at all. And here too, the lightness of the bag makes the tear resistance all the more impressive. The bag's light weight increases its usefulness and economy for shipping and mailing. This bag is an excellent safeguard against hand opening by young children, and will break open only under the most aggravated abuse.

The exact reason for the extreme tear resistance of the foam and fibrous layer combination is not entirely clear. Several factors are believed to contribute. One such factor is that the thick, padded combination is difficult to grip to apply significant tearing forces. In a bag, this quality is compounded because, to tear the bag, either the bag face must be pinched, doubling the thickness and doubling the tear resistant layer, or a seam containing two of each layer in the multilayer sheets must be used. Because of its resilient cushioning characteristics the foam is not firmly gripped very easily.

Another factor believed to make tearing extremely difficult is that the foam prevents tearing forces being concentrated in the tear resistant layer. The foam can prevent the tear resistant layer being bent to a sharp angle, and forces applied to the combination deform the foam rather than tearing the more durable layer.

For the purpose of comparison, FIG. 4 shows a single thin sheet 60 about to be torn. The layer is pinched firmly by the left hand between the thumb 61 and index finger 62. The thumb 61 beneath the layer 60 is so positioned to provide a bend 64 of sharp angularity across the thumb nail 65. The remainder of the layer 60 extending from between the left hand thumb and index finger is gripped firmly by the right hand thumb 67 and index finger 68. Both hands pinch the layer sufficiently tightly to prevent the thumb or finger from slipping. The right hand is used to apply force in the direction of the unnumbered arrow shown.

Figure 5:
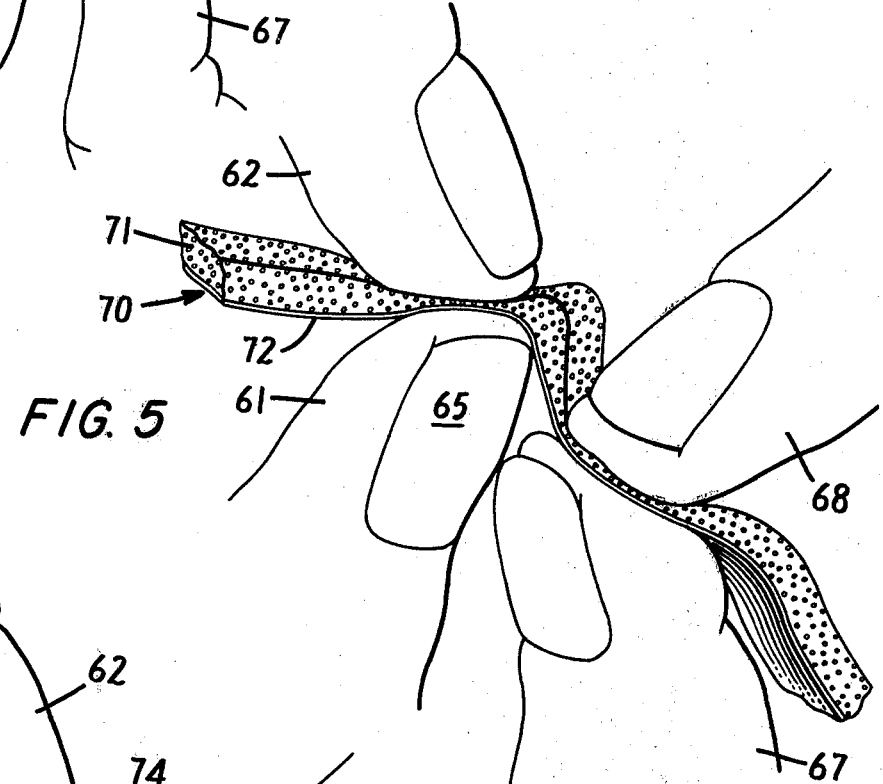
FIG. 5 is an enlarged diagramatic illustration of the application of tearing forces to a sheet of combined tear resistant and cushioning layers according to the invention.
Figure 6:
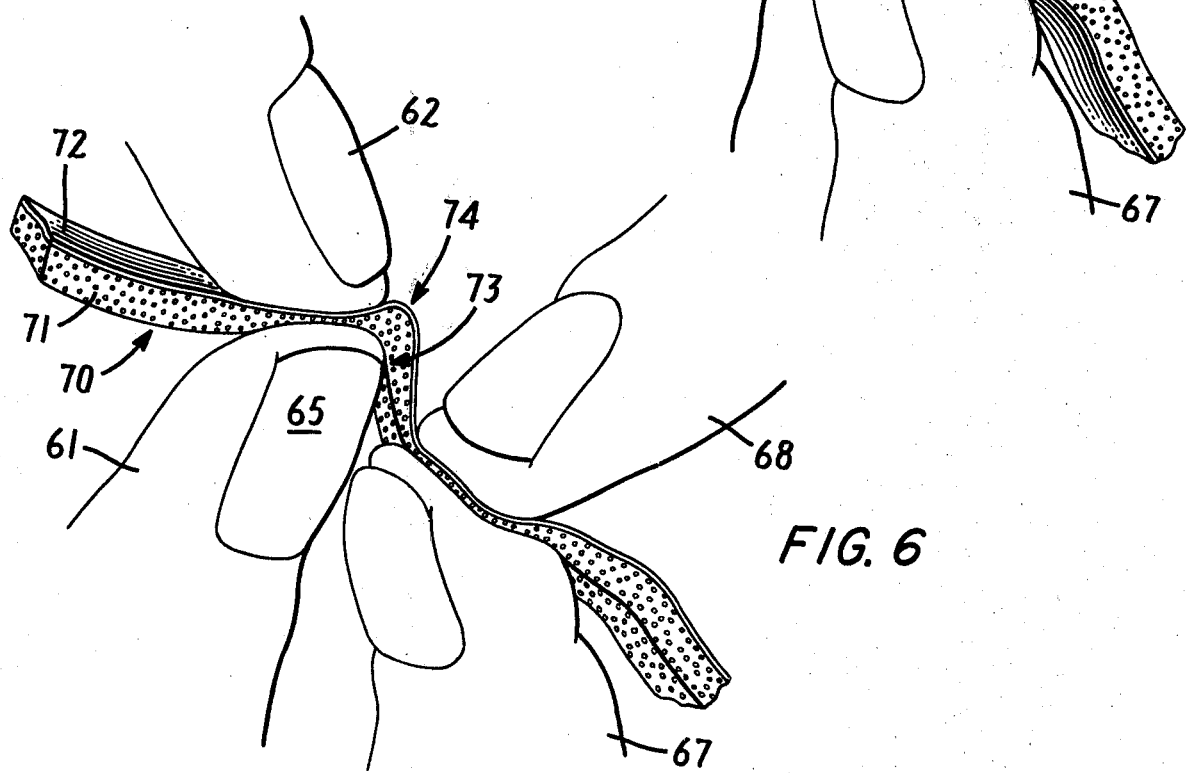
FIG. 6 is a further enlarged diagramatic illustration of the application of tearing forces to the combined sheet of FIG. 5 with the sheet inverted from its FIG. 5 position.

FIGS. 5 and 6 depict attempts to apply the same tearing forces to a combined layer 70 of foam 71 and tear resistant sheet 72. As both hands attempt to grip the two layers immovably, extreme pinching forces are applied just to try to crimp the foam 71 sufficiently to maintain a firm grip on the tear resistant layer 72. Nevertheless the pinching fingers are moveable relative to one another, and a firm grip is not attained.

In FIG. 5 the tear resistant layer is immediately adjacent the left hand thumb nail 65. A sharp tearing angle is defined at the thumb nail in the tear resistant layer but it is difficult for the index finger 62 to pinch the tear resistant layer immovably between itself and the thumb 61. The right hand index finger 68 tends to move with the foam surface relative to the tear resistant layer 72 and the thumb 67. When forces are applied along the two plies, they tend to stretch the foam parallel the tear resistant layer. It is extremely difficult to apply tearing forces to the tear resistant layer 72.

In FIG. 6 it is the foam layer that engages the left hand thumb 61 at the nail 65. At least some of the force that is applied by the right hand is used to stretch the foam layer 71 in the region 73 and to compress the foam across the thumb nail 65. The important angularity that helps to tear the thin sheet 60 of FIG. 4 is prevented by the interpositioning of the foam layer between the thumb 61 and the tear resistant layer 72. A more gentle curve about the thumb 61 naturally occurs as shown at 74, across a bulge of foam pinched from between the thumb and finger 61 and 62. Moreover, the tendency of the foam layer to deform again makes it very difficult to apply the necessary forces to the tear resistant layer. Forces applied to the foam result in a deformation of the foam. The foam layer is resilient and tensile forces stretch the layer leaving the tear resistant layer unmoved.

From the foregoing it will be seen that bags according to applicant's invention are particularly desirable for the qualities above described. Whereas the above embodiments are believed best for the purposes mentioned, it will be understood that modifications may be made by those skilled in the art without departure from the spirit and scope of applicant's invention as described in the appended claims.

I claim:

1. A padded and tear resistant bag having a bag body formed from at least one multilayer sheet, said sheet comprising a layer of tear resistant fibrous material having a resistance to tearing greatly exceeding that of paper, and a layer of synthetic foam material, the tear resistant and foam materials being joined together in said sheet over substantially the entire area of the body of said bag, whereby the foam provides cushioning to the bag body, increasing resistance to puncture from within, and enhances the tear resistance provided by the tear resistant fibrous layer.

2. The bag according to claim 1 wherein said tear resistant fibrous material is synthetic plastic fibers joined in a nonwoven sheet.

3. The bag according to claim 2 wherein said foam is sponge-like and at least several times the thickness of said tear resistant sheet, whereby said foam deters firm gripping of the tear resistant sheet to further substantially increase the tear resistance of the multilayer sheet beyond that of the tear resistant layer.

4. The bag according to claim 3 wherein the foam is polyethylene foam.

5. The bag according to claim 1 wherein the layer of tear resistant material is disposed nearer the bag interior than said foam layer and is substantially more resistant to tearing than said foam.

6. The bag according to claim 5 wherein the at least one sheet further includes an outer layer of paper joined over substantially the area of the bag body with the layers of foam and tear resistant material, said tear resistant material being substantially more tear resistant than any other bag layer.

7. The bag according to claim 5 wherein the at least one sheet further includes a layer of synthetic plastic sheet material between said tear resistant layer and said foam layer and joining together said tear resistant layer and said foam layer over substantially the area of the bag body.

8. The bag according to claim 5, wherein the at least one sheet further includes an innermost layer of synthetic plastic material joined to remaining layers of the multilayer sheet over substantially the area of the bag body.

9. The bag according to claim 1 further including at least one closure flap, the closure flap including an extension of at least one of the layers of one multilayer sheet forming a side of the bag body, said flap being free of said tear resistant layer.

10. The bag according to claim 1 wherein each multilayer sheet forming the bag body includes an outer kraft layer cover adherent to said foam layer, a layer of synthetic plastic sheet affixed to the interior face of the foam layer and affixed to the outermost face of the tear resistant layer, and an innermost layer of synthetic plastic sheet affixed to the innermost face of the tear resistant layer.

11. A padded and tear resistant bag comprising at least one multilayer sheet including a first layer of tear resistant material of synthetic plastic fibers joined in a nonwoven sheet and a second layer of synthetic foam material much less resistant to tear than said tear resistant material, said tear resistant material and said foam combining to form a sheet substantially more resistant to manual tearing than said tear resistant sheet, said foam preventing manual folding of said tear resistant layer to a sharp, tear initiating fold.

* * * * *